(12) United States Patent
Bresser et al.

(10) Patent No.: US 12,715,411 B2
(45) Date of Patent: Aug. 25, 2026

(54) ACTUATION DEVICE FOR A BRAKE SYSTEM

(71) Applicant: Robert Bosch GmbH, Stuttgart (DE)

(72) Inventors: Andreas Bresser, Ludwigsburg (DE); Mark Boehm, Lehrensteinsfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 343 days.

(21) Appl. No.: 18/693,200

(22) PCT Filed: May 25, 2023

(86) PCT No.: PCT/EP2023/064049
§ 371 (c)(1),
(2) Date: Mar. 19, 2024

(87) PCT Pub. No.: WO2023/232632
PCT Pub. Date: Dec. 7, 2023

(65) Prior Publication Data

US 2025/0001991 A1 Jan. 2, 2025

(30) Foreign Application Priority Data

May 30, 2022 (DE) ..................... 10 2022 205 428.8

(51) Int. Cl.
*B60T 13/74* (2006.01)

(52) U.S. Cl.
CPC .......... *B60T 13/745* (2013.01); *B60T 13/746* (2013.01)

(58) Field of Classification Search
CPC ............................................. B60T 13/743–746
See application file for complete search history.

(56) References Cited

U.S. PATENT DOCUMENTS

2005/0252734 A1 11/2005 Giering
2010/0242469 A1* 9/2010 Jungbecker ........... B60T 13/745 60/594

(Continued)

FOREIGN PATENT DOCUMENTS

EP 1598253 A1 11/2005
JP 2015047957 A * 3/2015

(Continued)

OTHER PUBLICATIONS

International Search Report for PCT/EP2023/064049, Issued Aug. 23, 2023.

*Primary Examiner* — David R Morris
(74) *Attorney, Agent, or Firm* — NORTON ROSE FULBRIGHT US LLP

(57) ABSTRACT

An actuation device for a brake system. The actuation device includes an electric machine, a rotor of the electric machine is arranged on a rotatably mounted drive shaft in a rotationally fixed manner; a displaceably mounted pressure element; a transmission device by means of which the drive shaft is operatively connected to the pressure element such that the pressure element can be moved by a rotation of the drive shaft, the transmission device having a displaceable threaded spindle; and an anti-rotation device which acts between the threaded spindle and a housing of the actuation device and which includes a circumferential backlash. The actuation device includes a spring element which applies a preload force to the threaded spindle in order to close the circumferential backlash.

13 Claims, 3 Drawing Sheets

(56) References Cited

U.S. PATENT DOCUMENTS

| | | | |
|---|---|---|---|
| 2015/0076972 | A1 | 3/2015 | Leiber et al. |
| 2019/0092298 | A1 | 3/2019 | Bach et al. |

FOREIGN PATENT DOCUMENTS

| | | | |
|---|---|---|---|
| JP | 2019017148 | A | 1/2019 |
| WO | 2020216492 | A1 | 10/2020 |
| WO | 2021172918 | A1 | 9/2021 |

* cited by examiner 1
2
53
40
27
50
23
52
15
16
25
26
21
20
28
24
30
22
49
19
54
7
8
18
3
17
4
5
6
10
11
9
13
12
14

ACTUATION DEVICE FOR A BRAKE SYSTEM

FIELD

The present invention relates to an actuation device for a brake system, comprising an electric machine, wherein a rotor of the electric machine is arranged on a rotatably mounted drive shaft in a rotationally fixed manner, a displaceably mounted pressure element, a transmission device, by means of which the drive shaft is operatively connected to the pressure element such that the pressure element can be moved by a rotation of the drive shaft, said transmission device having a displaceable threaded spindle, and an anti-rotation device which acts between the threaded spindle and a housing of the actuation device and which has a circumferential backlash.

BACKGROUND INFORMATION

A hydraulic brake system of a motor vehicle typically comprises a plurality of friction brake devices. The friction brake devices are operatively connected to an actuation device of the brake system such that the friction brake devices can be actuated by the actuation device. With the increasing electrification of motor vehicles, actuation devices of brake systems are also becoming increasingly electrified. In this respect, a conventional method is to equip an actuation device for a brake system with an electric machine, wherein a rotor of the electric machine is arranged in a rotationally fixed manner on a rotatably mounted drive shaft. To make possible an actuation of the friction brake devices by the actuation device, the actuation device also includes a displaceably mounted pressure element. The drive shaft is operatively connected to the pressure element by a transmission device such that the pressure element is displaceable by rotating the drive shaft. The transmission device is therefore designed to convert a rotation of the drive shaft into a translational movement of the pressure element. For this purpose, the transmission device often has a displaceable threaded spindle. In order to limit the rotation of the threaded spindle when the actuation device is in operation, there is usually an anti-rotation device that acts between the threaded spindle and a housing of the actuation device. In order to achieve low-friction displacement of the threaded spindle, the anti-rotation device typically has a circumferential backlash. However, this comes with the problem that clicking noises or banging noises can occur when the actuation device is in operation.

SUMMARY

An actuation device according to the present invention may have an advantage of being relatively quiet when in operation. To this end, an example embodiment of the present invention provides that the actuation device comprises a spring element which applies a preload force to the threaded spindle in order to close the circumferential backlash. Because the anti-rotation device has a circumferential backlash, the threaded spindle can rotate at least slightly relative to the housing. The threaded spindle can generally be rotated in a first direction of rotation, which closes the circumferential backlash, and in a second direction of rotation, which opens the circumferential backlash. If the circumferential backlash is closed, a sufficiently strong force acting on the threaded spindle in the first direction of rotation causes the threaded spindle to be displaced in the direction of the pressure element. If the friction brake devices are to be actuated by the actuation device, the electric machine is therefore controlled such that it provides a force acting on the threaded spindle in the first direction of rotation. If the circumferential backlash is open before the electric machine is actuated, the threaded spindle is initially turned in the first direction of rotation by the force provided. Only when the circumferential backlash is closed is the threaded spindle then moved in the direction of the pressure element. However, closing the circumferential backlash is accompanied by the aforementioned clicking noises or banging noises. These noises can be avoided by the spring element according to the present invention. According to the present invention, the preload force provided by the spring element acts on the threaded spindle in order to close the circumferential backlash, i.e., in the first direction of rotation. Preferably, the spring element is designed such that the circumferential backlash is closed by the preload force. Because the circumferential backlash is already closed by the preload force, there is no need to first close the circumferential backlash when the friction brake devices are actuated by the electric machine. This avoids clicking noises or banging noises. According to a preferred embodiment, the transmission device has a spindle gear, wherein the spindle gear has the threaded spindle. According to an alternative embodiment of the present invention, the transmission device preferably has a ball screw drive, wherein the ball screw drive has the threaded spindle.

Preferably, according to an example embodiment of the present invention, the anti-rotation device has at least one first stop connected to the threaded spindle in a rotationally fixed manner and at least one second stop arranged fixed to the housing, wherein the spring element presses the first stop against the second stop in order to close the circumferential backlash. If the first stop is in contact with the second stop, the circumferential backlash is closed. If the first stop is at a distance from the second stop, the circumferential backlash is at least partially open. The first stop is preferably aligned in the first direction of rotation. The second stop is then correspondingly aligned against the first direction of rotation, i.e., in the second direction of rotation. The stops ensure mechanically robust guidance of the threaded spindle in the housing when the circumferential backlash is closed.

Preferably, according to an example embodiment of the present invention, the spring element is a coil spring. This design of the spring element keeps manufacturing costs low. In addition, a spring element designed as a coil spring can be integrated into the actuation device to save space.

According to a preferred embodiment of the present invention, it is provided that the preload force is a torsional force. The spring element is therefore twisted such that it provides the preload force as a torsional force. In this embodiment, the spring element is preferably arranged such that the longitudinal center axis of the spring element is aligned parallel to the longitudinal center axis of the threaded spindle. According to an alternative embodiment, it is preferable that the preload force is a compressive force. The spring element is therefore compressed such that it provides the preload force as a compressive force. According to an alternative embodiment, it is preferably provided that the preload force is a tensile force. The spring element is therefore stretched such that it provides the preload force as a tensile force. In the two aforementioned embodiments, the spring element is preferably arranged such that the longitudinal center axis of the spring element is aligned perpendicular to the longitudinal center axis of the threaded spindle.

According to a preferred embodiment of the present invention, it is provided that the spring element is designed such that, in addition to the preload force, it applies a restoring force directed away from the pressure element to the threaded spindle. The function of the spring element is therefore extended such that the spring element resets the threaded spindle following actuation of the friction brake devices. In this embodiment, the spring element is preferably designed such that the preload force is a torsional force. The spring element is then twisted such that it provides the preload force as a torsional force, and compressed or stretched such that it provides the restoring force as a compressive force or as a tensile force.

Preferably, according to an example embodiment of the present invention, the threaded spindle and the spring element are arranged coaxially to each other. This achieves a space-saving integration of the spring element into the actuation device. In addition, a coaxial arrangement of the threaded spindle and the spring element prevents the aforementioned restoring force from causing the threaded spindle to tip or tilt. Preferably, the spring element surrounds the threaded spindle radially in relation to the longitudinal center axis of the threaded spindle.

According to a preferred embodiment of the present invention, it is provided that a first end of the spring element is arranged on the threaded spindle or on an element that is connected to the threaded spindle in a rotationally fixed manner. This ensures reliable transmission of the preload force to the threaded spindle.

According to a preferred embodiment of the present invention, it is provided that the threaded spindle has a first end section facing away from the pressure element with an axial stop, and the first end of the spring element is arranged on the axial stop. The first end section facing away from the pressure element is technically easily accessible, which is why the arrangement of the spring element on the axial stop of the first end section is preferred.

Preferably, according to an example embodiment of the present invention, a second end of the spring element is arranged on the housing or on an element fixed to the housing. This provides a mechanically robust support for the spring element so that the preload force is reliably transmitted to the threaded spindle.

Preferably, according to an example embodiment of the present invention, the second end of the spring element is arranged on a bearing ring of a rotary bearing of the actuation device that is fixed to the housing. This allows a mechanically robust arrangement of the second end of the spring element to be achieved. As mentioned above, the transmission device preferably comprises a spindle gear, wherein the spindle gear comprises the threaded spindle. Particularly preferably, a spindle nut of the spindle gear is rotatably mounted by means of the rotary bearing. The rotary bearing thus serves both to support the spindle nut and to support the spring element.

Preferably, according to an example embodiment of the present invention, the threaded spindle interacts directly with the housing to form the anti-rotation device. This provides a mechanically particularly robust anti-rotation device. Because the threaded spindle interacts directly with the housing to form the anti-rotation device, the tolerance chain with regard to the anti-rotation device is also minimized.

According to an alternative embodiment of the present invention, it is preferably provided that an anti-rotation element is connected to the threaded spindle in a rotationally fixed manner and that the anti-rotation element interacts directly with the housing to form the anti-rotation device. This can reduce the weight and/or the manufacturing costs for the actuation device. For this purpose, the anti-rotation element is preferably made of plastic. The threaded spindle, on the other hand, is preferably made of a metal material. The anti-rotation element is particularly preferably arranged on a second end section of the threaded spindle facing the pressure element.

According to a preferred embodiment of the present invention, it is provided that the housing has at least one radial recess in which a radial projection of the threaded spindle or a radial projection of the anti-rotation element engages radially to form the anti-rotation device. This results in a mechanically robust anti-rotation device. Preferably, the radial recess is designed as a groove that extends through the housing in the direction of displacement of the threaded spindle. Preferably, the threaded spindle or the anti-rotation element comprise a plurality of radial projections, wherein each of the radial projections engages radially in a different radial recess of the housing. Two radial projections that are diametrically opposite one another in relation to the longitudinal center axis of the threaded spindle are particularly preferred.

The present invention is explained in more detail below with reference to the figures.

DETAILED DESCRIPTION OF EXAMPLE EMBODIMENTS

Figure 1:
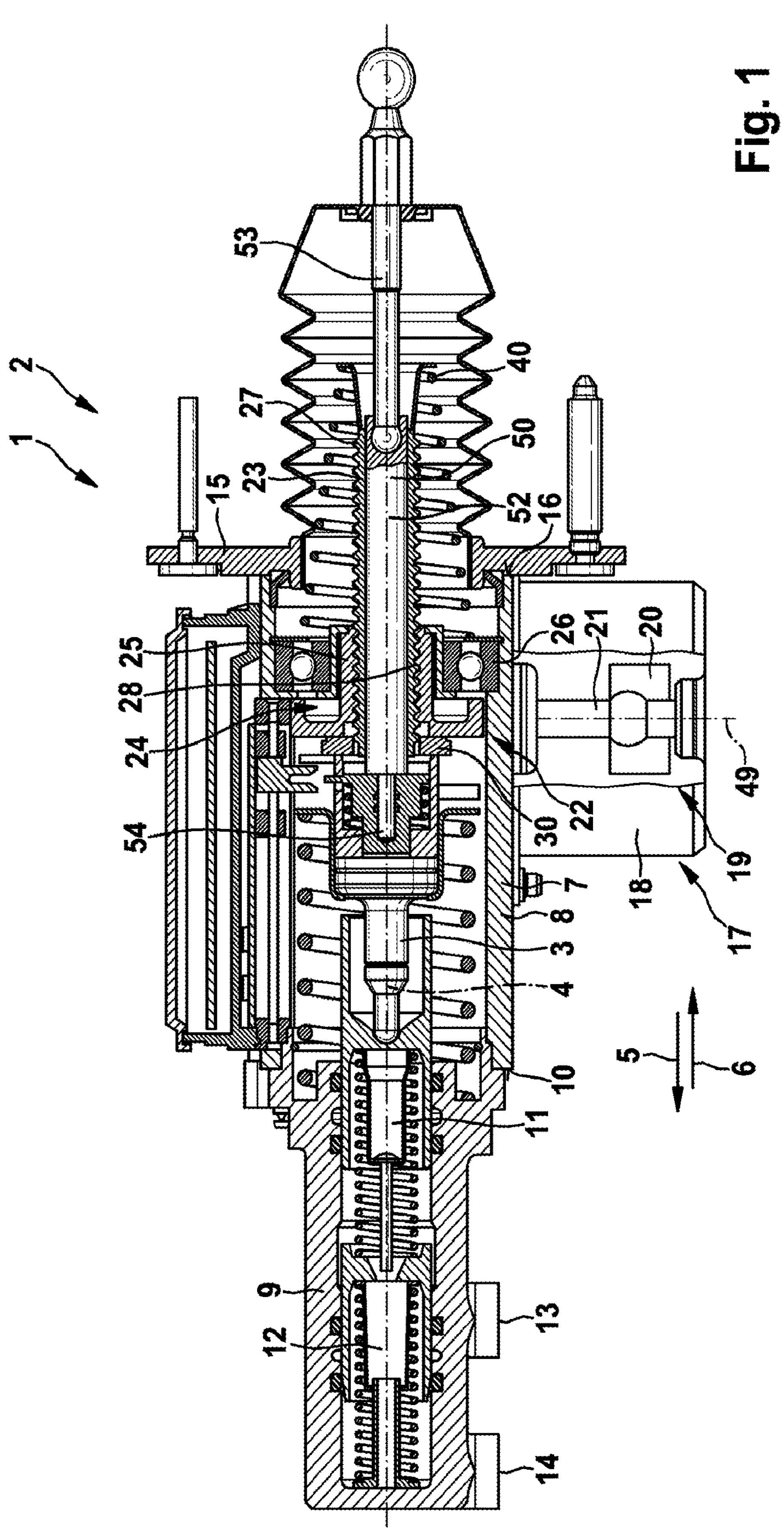
FIG. 1 shows a sectional view of an actuation device for a brake system, according to an example embodiment of the present invention.

FIG. 1 shows a longitudinal section through an actuation device 1 for a brake system 2, not shown in detail, of a motor vehicle. The actuation device 1 has a displaceably mounted pressure element 3, which, in the case at hand, is designed as a pressure rod 3. The pressure element 3 is displaceable along its longitudinal center axis 4 in a first direction 5 and in a second direction 6 opposite to the first direction 5. The pressure element 3 is arranged at least partially in a housing 7 of the actuation device 1. The housing 7 has a casing wall 8 that is closed in the peripheral direction and is therefore cylindrical in shape. The casing wall 8 forms or encloses the inside of the housing 7.

On the housing 7, a master brake cylinder 9 of the actuation device 1 is arranged fixed to the housing. In the case at hand, the master brake cylinder 11 is arranged on a first end face 10 of the casing wall 8. A first hydraulic piston 11 and a second hydraulic piston 12 are displaceably mounted in the master brake cylinder 9, namely in the first direction 5 and in the second direction 6. The master brake cylinder 9 comprises a plurality of hydraulic connections 13, 14. If the actuation device 1 is installed as intended in the brake system 2, the hydraulic connections 13, 14 are fluidically connected to slave cylinders of friction brake devices of the brake system 2. The friction brake devices can then be actuated by moving the hydraulic pistons 11 and 12 in the first direction 5. The pressure element 3 is coupled to the hydraulic pistons 11 and 12 such that the hydraulic pistons 11 and 12 are displaceable in the first direction 5 by the pressure element 3. The friction brake devices can therefore be actuated by moving the pressure element 3. A housing plate 15 is fixed to the housing 7. In the present case, the housing plate 15 is arranged on a second end face 16 of the casing wall 8 facing away from the first end face 10. The housing plate 15 at least partially closes the interior of the housing 7.

The actuation device 1 also comprises a drive unit 17. The drive unit 17 comprises a motor housing 18 in which an electric machine 19 is arranged. An annular rotor 20 of the electric machine 19 is arranged on a drive shaft 21 in a rotationally fixed manner, wherein the drive shaft 21 is mounted so that it can rotate about an axis of rotation 49. The motor housing 18 is attached to the housing 7.

The drive shaft 21 is coupled to the pressure element 3 by a transmission device 22 such that the pressure element 3 is displaceable by a rotation of the drive shaft 21. The transmission device 22 is therefore designed to convert a rotation of the drive shaft 21 into a translational displacement of the pressure element 3. For this purpose, the transmission device 22 comprises a displaceable threaded spindle 23. The threaded spindle 23 is displaceable in the first direction 5 and in the second direction 6. In the case at hand, the threaded spindle 23 is part of a spindle gear 24 of the transmission device 22. In addition to the threaded spindle 23, the spindle gear 24 has a spindle nut 25. The spindle nut 25 is rotatably mounted by means of a rotary bearing 26. A drive gearing 27 of the threaded spindle 23 meshes with an output gearing 28 of the spindle nut 25. The spindle nut 25 can be rotated by rotating the drive shaft 21. In the case at hand, the spindle nut 25 is operatively connected to the drive shaft 21 by a worm gear not shown in the figures.

Figure 2:
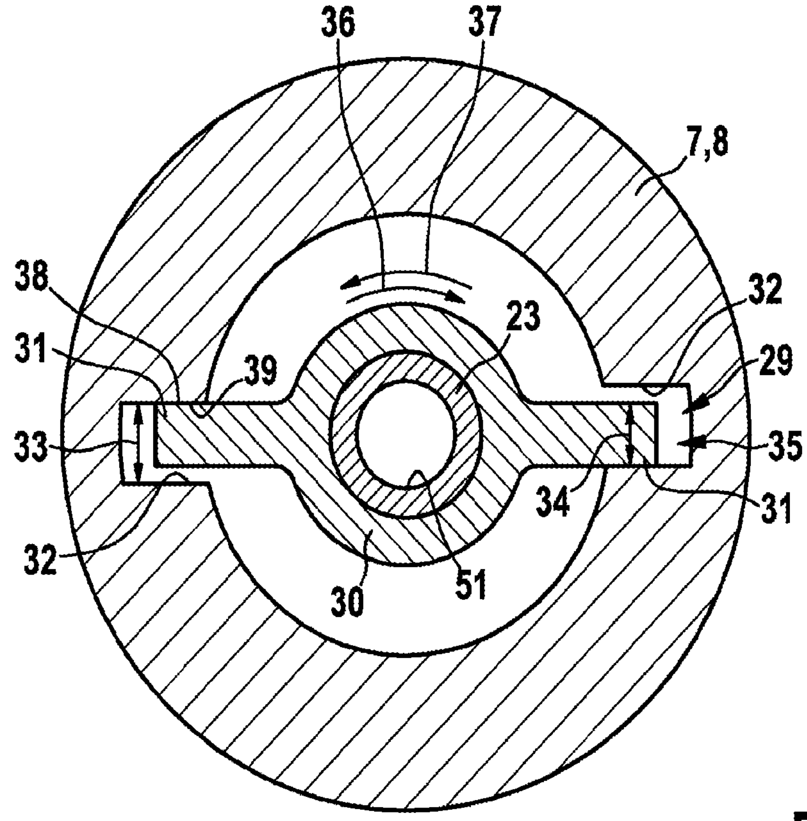
FIG. 2 shows a further sectional view of the actuation device, according to an example embodiment of the present invention.

In order to prevent the threaded spindle 23 from rotating with the spindle nut 25 when the spindle nut 25 rotates, an anti-rotation device 29 is assigned to the threaded spindle 23. The anti-rotation device 29 acts between the threaded spindle 23 and the housing 7 and limits the rotation of these two elements relative to each other. FIG. 2 shows a cross-section through the actuation device 1 in the area of the anti-rotation device 29. In the case at hand, the actuation device 1 has an anti-rotation element 30 that is connected to the threaded spindle 23 in a rotationally fixed manner. The anti-rotation element 30 interacts with the housing 7 to form the anti-rotation device 29. According to a further embodiment example, the anti-rotation element 30 is dispensed with, wherein the threaded spindle 23 interacts directly with the housing 7 to form the anti-rotation device 29. In the present case, the anti-rotation element 30 has two radial projections 31, each of which engages radially in a different radial recess 32 of the housing 7 to form the anti-rotation device 29. In the present case, the radial projections 31 are diametrically opposite each other in relation to the longitudinal center axis of the threaded spindle 23. The radial recesses 32 are formed as grooves 32, which extend through the housing 7 in the axial direction.

As can be seen from FIG. 2, a width 33 of the radial recesses 32 is greater than a width 34 of the radial projections 31. Accordingly, the anti-rotation device 29 comprises a circumferential backlash 35, so that at least a slight rotation of the threaded spindle 23 relative to the housing 7 is possible. The threaded spindle 23 can generally be rotated in a first direction of rotation 36, which closes the circumferential backlash 35, and in a second direction of rotation 37, which opens the circumferential backlash 35. If the circumferential backlash 35 is closed, a sufficiently strong force acting on the threaded spindle 23 in the first direction of rotation 36 causes the threaded spindle 23 to be displaced in the direction of the pressure element 3, i.e., in the first direction 5. If the friction brake devices are to be actuated by the actuation device 1, the electric machine 19 is therefore controlled such that it provides a force acting on the threaded spindle 23 in the first direction of rotation 36. If the circumferential backlash 35 is open before the electric machine 19 is actuated, the threaded spindle 23 is initially turned in the first direction of rotation 36 by the force provided. The threaded spindle 23 is only moved in the first direction 5 when the circumferential backlash 35 is closed. However, the closing of the circumferential backlash 35 is accompanied by the generation of a clicking noise or banging noise. In the actuation device 1 shown in FIG. 2, the circumferential backlash 35 is closed. As can be seen from FIG. 2, a first stop 38 of the radial projections 31 is in contact with a second stop 39 of the radial recesses 32 when the circumferential backlash 35 is closed.

Figure 3:
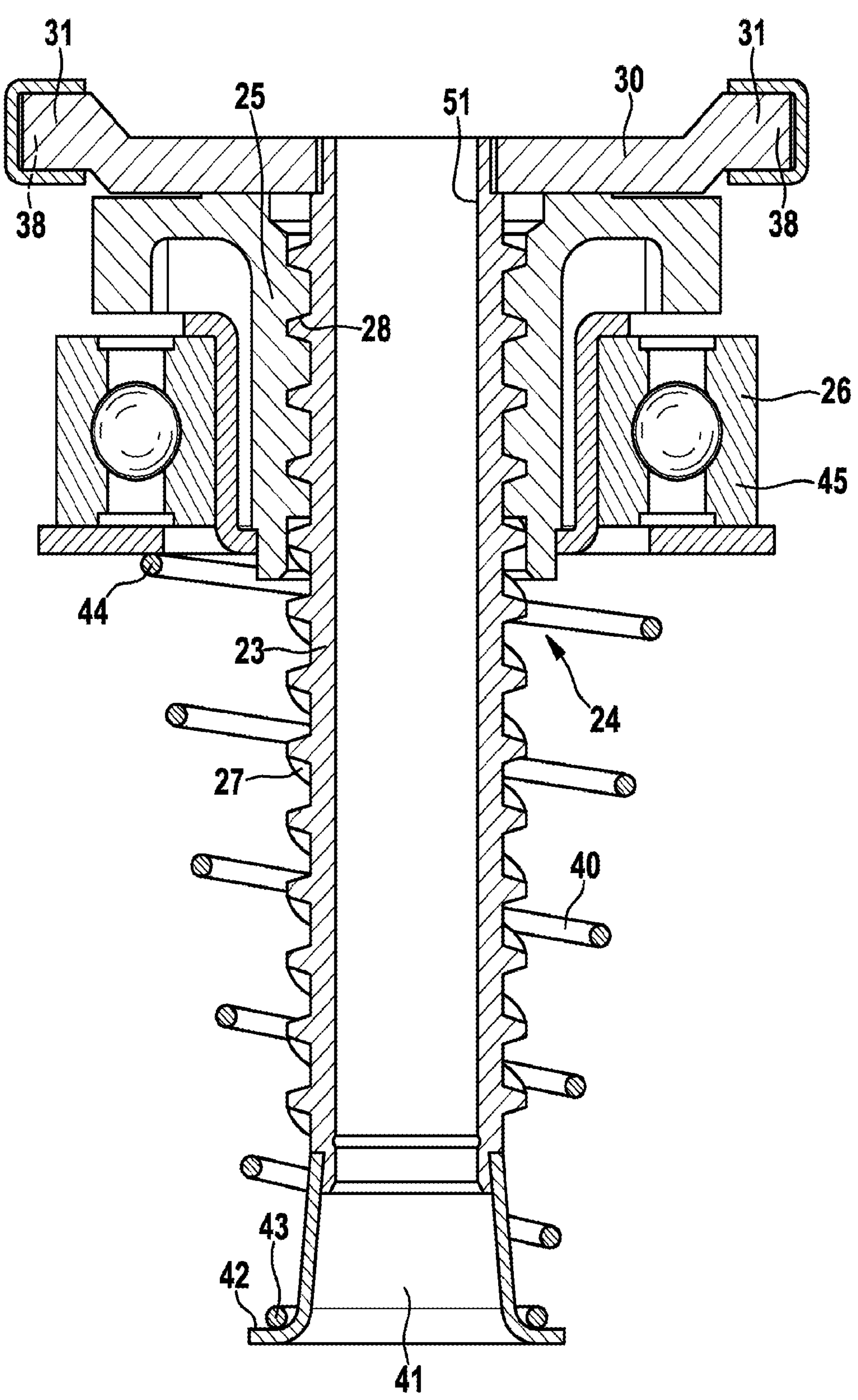
FIG. 3 shows an enlarged detailed view of the actuation device, according to an example embodiment of the present invention.

FIG. 3 shows a further longitudinal section of the actuation device 1 in the area of the threaded spindle 23. As can be seen from FIG. 3, the actuation device comprises a spring element 40. The spring element 40 applies a preload force to the threaded spindle 23 in order to close the circumferential backlash 35. The preload force thus acts on the threaded spindle 23 in the first direction of rotation 36. The preload force ensures that the circumferential backlash 35 is always closed, in particular independently of any actuation of the electric machine 19. Because the circumferential backlash 35 is closed by the preload force, there is no need for the electrical machine 19 to overcome or close the circumferential backlash 35 when the friction brake devices are actuated. This means that the aforementioned clicking noise or banging noise does not occur.

According to the embodiment example shown in the figures, the spring element 40 is designed as a coil spring 40. The spring element 40 is arranged coaxially to the threaded spindle 23 and encloses the threaded spindle 23 radially with respect to the longitudinal center axis of the threaded spindle 23.

The threaded spindle 23 comprises a first end section 41 facing away from the pressure element 3 having an axial stop 42. The axial stop 42 faces the pressure element 3. A first end 43 of the spring element 40 is arranged at the axial stop 42. The spring element 40 also comprises a second end 44. The second end 44 is arranged on a bearing ring 45 of the rotary bearing 26 which is fixed to the housing. However, other arrangements of the spring element 40 are also possible. For example, according to a further embodiment example, the first end 43 is not arranged on the threaded spindle 23, but on the anti-rotation element 30. According to a further embodiment example, the second end 44 is not arranged on the bearing ring 45, but for example directly on the housing 7.

According to the embodiment example shown in the figures, the spring element 40 is twisted such that it provides the preload force as a torsional force. In addition, the spring element 40 is compressed such that it applies, in addition to the preload force, a restoring force directed away from the pressure element 3 to the threaded spindle 23. However, other embodiments of the spring element 40 are also possible. According to a further embodiment example, the spring element 40 is arranged in one of the radial recesses 32 and is compressed such that it provides a compressive force acting on the radial projection 31 in the first direction of rotation 36. Even in such an embodiment, closing of the circumferential backlash 35 can be achieved by the spring element 40.

The actuation device 1 also comprises an actuating element 50 which is displaceably mounted in an axial aperture 51 of the threaded spindle 23. A first end 52 of the actuating element 50 can be/is coupled to a brake pedal of the brake system 2 by an input rod 53, so that the actuating element 50 can then be displaceably actuated by an actuation of the brake pedal. A second end 54 of the actuating element 50 is coupled to the pressure element 3 such that the pressure element 3 is displaceable by the actuating element 50. The friction brake devices can therefore also be actuated by pressing the brake pedal.

The invention claimed is:

1. An actuation device for a brake system, comprising:

an electric machine, wherein a rotor of the electric machine is arranged on a rotatably mounted drive shaft in a rotationally fixed manner;

a displaceably mounted pressure element;

a transmission device using which the drive shaft is operatively connected to the pressure element such that the pressure element can be moved by a rotation of the drive shaft, the transmission device having a displaceable threaded spindle, and an anti-rotation device which acts between the threaded spindle and a housing of the actuation device, and which has a circumferential backlash; and a spring element which applies a preload force to the threaded spindle in order to close the circumferential backlash.

2. The actuation device according to claim 1, further comprising at least one first stop connected to the threaded spindle in a rotationally fixed manner and at least one second stop arranged fixed to the housing, wherein the spring element presses the first stop against the second stop in order to close the circumferential backlash.

3. The actuation device according to claim 1, wherein the spring element is a coil spring.

4. The actuation device according to claim 1, wherein the preload force is a torsional force or a compressive force or a tensile force.

5. The actuation device according to claim 1, wherein the spring element is configured such that, in addition to the preload force, the spring element applies a restoring force directed away from the pressure element to the threaded spindle.

6. The actuation device according to claim 1, wherein the threaded spindle and the spring element are arranged coaxially with respect to one another.

7. The actuation device according to claim 1, wherein a first end of the spring element is arranged on the threaded spindle or on an element connected to the threaded spindle in a rotationally fixed manner.

8. The actuation device according to claim 7, wherein the threaded spindle includes a first end section facing away from the pressure element and having an axial stop, and the first end of the spring element is arranged on the axial stop.

9. The actuation device according to claim 7, wherein a second end of the spring element is arranged on the housing or on an element which is arranged fixed to the housing.

10. The actuation device according to claim 9, wherein the second end of the spring element is arranged on a bearing ring, which is fixed to the housing, of a rotary bearing of the actuation device.

11. The actuation device according to claim 1, wherein the threaded spindle interacts directly with the housing to form the anti-rotation device.

12. The actuation device according to claim 11, wherein the housing has at least one radial recess into which a radial projection of the threaded spindle or a radial projection of the anti-rotation element engages radially to form the anti-rotation device.

13. The actuation device according to claim 1, wherein an anti-rotation element is connected to the threaded spindle in a rotationally fixed manner, and the anti-rotation element interacts directly with the housing to form the anti-rotation device.

* * * * *